W. M. BOWMAN.
WRENCH.
APPLICATION FILED APR. 21, 1917.
1,250,549.
Patented Dec. 18, 1917.
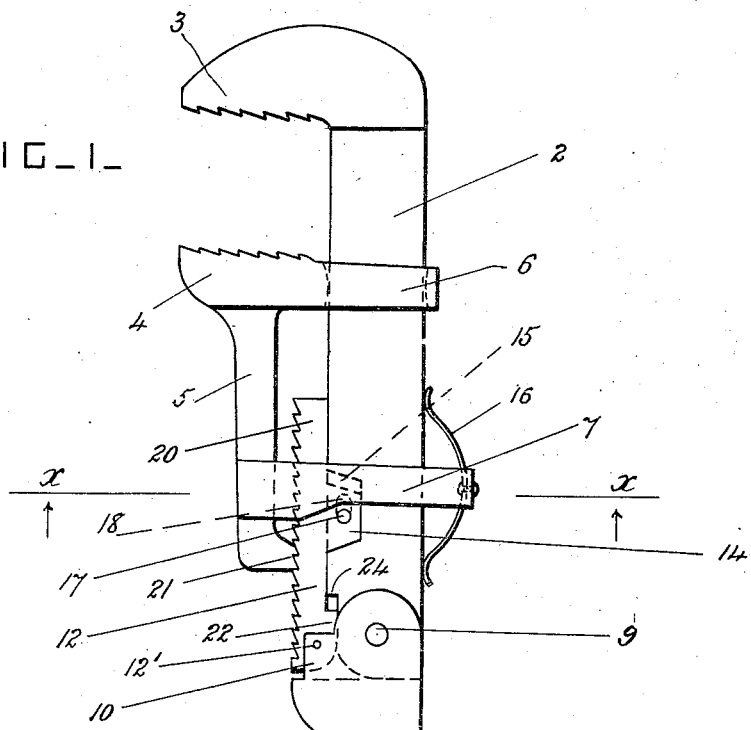
FIG_1_
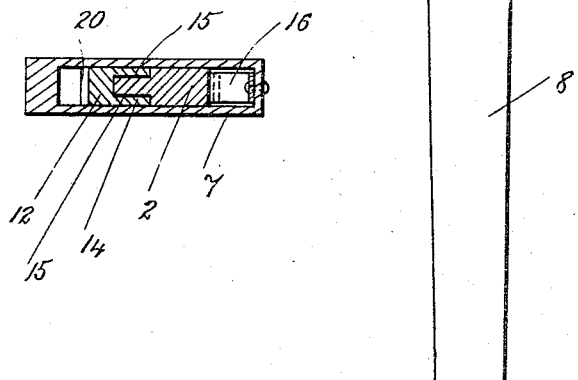
FIG_2_
Inventor
William M. Bowman
by Herbert W. T. Jenner.
Attorney.

UNITED STATES PATENT OFFICE.

WILLIAM MORRISON BOWMAN, OF FORSYTH, MONTANA.

WRENCH.

1,250,549.  Specification of Letters Patent.  Patented Dec. 18, 1917.

Application filed April 21, 1917. Serial No. 163,659.

*To all whom it may concern:*

Be it known that I, WILLIAM M. BOWMAN, a subject of the King of Great Britain and Ireland, residing at Forsyth, in the county of Rosebud and State of Montana, have invented certain new and useful Improvements in Wrenches; and I do hereby declare the following to be a full, clear, and exact description of the invention, such as will enable others skilled in the art to which it appertains to make and use the same.

This invention relates to wrenches provided with slidable jaws, and more particularly adapted for use on pipes; and it consists in the novel construction and combination of the parts hereinafter fully described and claimed.

In the drawings, Figure 1 is a side view of a pipe wrench constructed according to this invention. Fig. 2 is a cross-section taken on the line $x$—$x$ in Fig. 1 and looking upward.

A main shank 2 is provided and has a stationary jaw 3 at its upper end. The slidable jaw 4 is provided with a shank 5 arranged substantially parallel to the main shank 2, and the slidable jaw and its shank 5 have loop-shaped guides 6 and 7 which project laterally from them, and engage with the main shank 2.

The jaws 3 and 4 are preferably serrated so as to engage with a pipe, but they may be otherwise formed so as to engage with any desired object.

A handle 8 is pivoted by a pin 9 to the lower end portion of the main shank 2, and its front side is provided with a socket 10 adjacent to its pivot pin 9. A slide 12 is provided, and is arranged in the space between the two shanks.

The lower end portion of the slide is pivoted by a pin 12' in the socket 10, and its middle portion is provided with a forked jaw 14 which projects laterally of it and straddles an intervening portion of the main shank. The main shank is provided with recesses 15 for the forked portions of the jaw 14 to slide in, so that the sides of the jaw 14 and the sides of the slidable shank 5 are flush with the sides of the main shank 2.

The slide 12 works in the lower guide 7, and the loop of the lower guide is arranged to project beyond the main shank on the other side of it from the shank 5. A spring 16 is secured to the projecting end portion of the guide 7 and bears against the main shank 2, so that the slidable shank is drawn toward the main shank. The jaw 14 is provided with a guide pin 17 which slides in a longitudinal slot 18 in the main shank, so that the slide 12 is always retained in contact with the main shank 2.

The slide 12 has ratchet-shaped teeth 20, and the lower end portion of the slidable shank 5 has teeth 21 which engage with the teeth 20. The upper guide 6 is free to tilt a little on the main shank, and the jaws are adjusted to suit different sizes of pipe by moving the slidable jaw by hand, the teeth 21 being temporarily disengaged from the retaining teeth 20 by retracting the slide against the pressure of the spring 16. A stop 22 is formed on the lower end portion of the slide 12, and engages with a shoulder 24 on the main shank, and limits the upward movement of the slide 12.

The jaws are caused to grip the pipe tightly by the handle which turns on its pivot pin 9 when moved pivotally toward the left in Fig. 1, and thereby moves the slide 12 upwardly on the main shank and causes the slidable jaw to move toward the stationary jaw and grip the pipe tightly against it.

The pipe is released when the handle is moved in the opposite direction, and as the release is effected positively by the handle there is no tendency for the jaws to stick on the pipe.

What I claim is:

In a wrench, a stationary jaw provided with a long shank, a jaw provided with a relatively short shank and having an upper loop having convex ends which is free to slide and pivot on the long shank, said short shank having a lower loop which projects from its lower end portion and engages with the long shank loosely, and said short shank having also a tooth at its lower end, a toothed slide engaging with the said tooth and arranged to work in the lower loop between the two shanks and having its sides arranged flush with the sides of the long shank, said toothed slide extending from the bottom of the long shank to the middle part of its length only, means for holding the toothed slide in sliding contact with the long shank, a spring for holding the tooth of the short shank in retractable engagement with the toothed slide, and an operating handle pivoted to the lower end portions of the long shank and the toothed slide.

In testimony whereof I have affixed my signature.

WILLIAM MORRISON BOWMAN.

Copies of this patent may be obtained for five cents each, by addressing the "Commissioner of Patents, Washington, D. C."